(12) United States Patent
Ito et al.

(10) Patent No.: US 11,720,008 B2
(45) Date of Patent: Aug. 8, 2023

(54) PROJECTOR

(71) Applicant: SEIKO EPSON CORPORATION, Tokyo (JP)

(72) Inventors: Masatoshi Ito, Matsumoto (JP); Shinichi Wakabayashi, Suwa (JP); Yoshiyuki Yanagisawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/698,571

(22) Filed: Mar. 18, 2022

(65) Prior Publication Data
US 2022/0299848 A1 Sep. 22, 2022

(30) Foreign Application Priority Data
Mar. 19, 2021 (JP) ................. 2021-045554

(51) Int. Cl.
*G03B 21/14* (2006.01)
(52) U.S. Cl.
CPC ................. *G03B 21/145* (2013.01)
(58) Field of Classification Search
CPC .................................................. G03B 21/145
USPC ............................................... 353/22
See application file for complete search history.

(56) References Cited

U.S. PATENT DOCUMENTS

| 2017/0299883 A1 | 10/2017 | Nonaka et al. |
| 2018/0095269 A1 | 4/2018 | Mizoguchi et al. |
| 2019/0227261 A1* | 7/2019 | Smith .................. G02B 7/1821 |

FOREIGN PATENT DOCUMENTS

| JP | 2018-054974 A | 4/2018 |
| JP | 2019-128394 A | 8/2019 |

* cited by examiner

*Primary Examiner* — Jerry L Brooks
(74) *Attorney, Agent, or Firm* — Oliff PLC

(57) ABSTRACT

A projector according to an aspect of the present disclosure includes an optical path changer that is provided between an image formation unit and an projection optical unit and changes the optical path of image light from the image formation unit, a linkage frame that links the image formation unit and the projection optical unit to each other, and a vibration absorbing member that absorbs vibration generated by the optical path changer. The optical path changer includes a base member, an optical member, and a swing frame that supports the optical member and is swingably supported relative to the base member. The vibration absorbing member has vibration absorbing surfaces that are in contact with the base member of the optical path changer, and the vibration absorbing surfaces are in contact with support surfaces of the linkage frame to cause the support surfaces to support the optical path changer.

12 Claims, 11 Drawing Sheets

PROJECTOR

The present application is based on, and claims priority from JP Application Serial Number 2021-045554, filed Mar. 19, 2021, the disclosure of which is hereby incorporated by reference herein in its entirety.

BACKGROUND

1. Technical Field

The present disclosure relates to a projector.

2. Related Art

To make the resolution of a projected image higher than the resolution of a light modulator, such as a liquid crystal panel, there has been a known projector having a configuration in which the optical path of the light outputted from the light modulator is shifted. JP-A-2018-54974 discloses a projector including a light source, a light modulator including three liquid crystal display elements, an optical device that shifts the optical path of video light, and a projection lens. In the projector, the optical device is fixed to an enclosure via a fixing section of a linkage member.

In the projector disclosed in JP-A-2018-54974, vibration of the optical device is likely to be transmitted to the enclosure via the fixing section, and the transmitted vibration can produce operating noise when the optical device is driven. It is therefore desired to provide a projector that excels in quietness with high resolution of a projected image maintained.

SUMMARY

To achieve the object described above, a projector according to an aspect of the present disclosure includes an illumination unit, an image formation unit that modulates light outputted from the illumination unit to generate the image light, a projection optical unit that projects the image light outputted from the image formation unit, an optical path changer that is provided between the image formation unit and the projection optical unit and changes an optical path of the image light outputted from the image formation unit, a linkage frame that links the image formation unit and the projection optical unit to each other, and a vibration absorbing member that absorbs vibration generated by the optical path changer. The optical path changer includes a base member, an optical member on which the image light outputted from the image formation unit is incident, and a swing frame that supports the optical member and is swingably supported relative to the base member. The linkage frame has support surfaces. The vibration absorbing member has vibration absorbing surfaces that are in contact with the base member of the optical path changer, and the vibration absorbing surfaces are in contact with the support surfaces of the linkage frame to cause the support surfaces of the linkage frame to support the optical path changer.

DESCRIPTION OF EXEMPLARY EMBODIMENTS

First Embodiment

A first embodiment of the present disclosure will be described below with reference to FIGS. 1 to 8.

Figure 1:
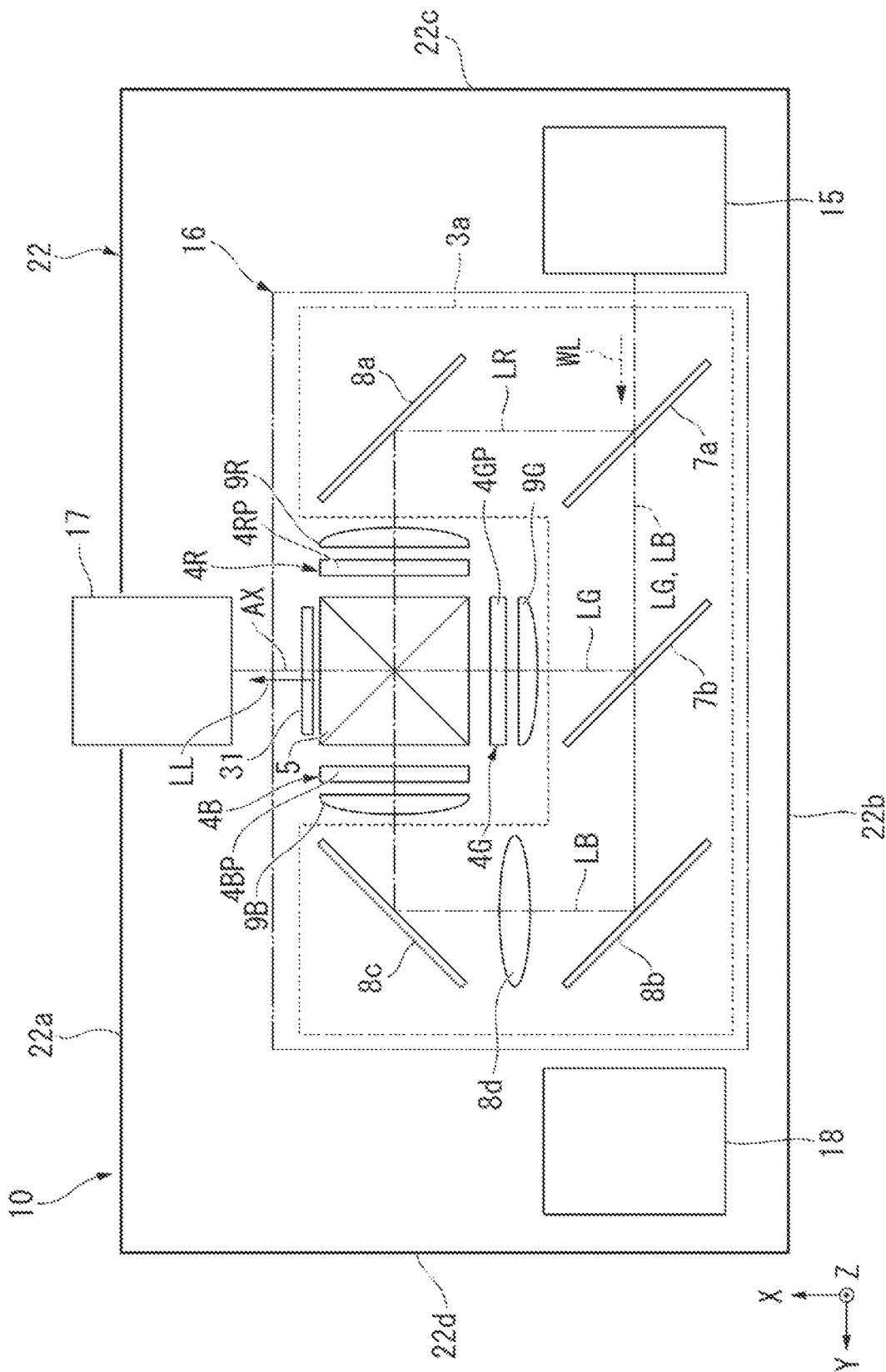
FIG. 1 is a schematic configuration diagram of a projector according to a first embodiment.

FIG. 1 is a schematic configuration diagram of a projector 10 according to the first embodiment.

In the following drawings, components are drawn at different dimensional scales in some cases for clarification of each of the components.

An XYZ orthogonal coordinate system is used as required in the drawings used in the following description.

The axis X is a projection of the optical axis of light outputted from a projection optical unit 17 and extends along the frontward-rearward direction when the projector 10 is viewed from above. The axis Z is perpendicular to the axis X and extends along the upward-downward direction. The axis Y is perpendicular to the axes X and Z and extends along the rightward-leftward direction. The present embodiment will be described under the following definitions: The near side from a viewer located behind the projector 10 is a side −X; the far side away from the viewer is a side +X; the upper side is a side +Z; the lower side is a side −Z; the right side is a side +Y; and the left side is a side −Y. The axes X, Y, and Z are defined as follows: the axis X is the direction in which a front surface 22a and a rear surface 22b of an exterior case 22 face each other; the axis Y is the direction in which a right side surface 22c and a left side surface 22d of the exterior case 22 face each other; and the axis Z is the direction in which the top surface and the bottom surface of the exterior case 22 face each other.

The projector 10 includes the exterior case 22, an illumination unit 15, an image formation unit 16, an optical path changer 31, the projection optical unit 17, a power supply unit 18, a control unit (not shown), a linkage frame 32 (see FIG. 3), and a vibration absorbing member 33 (see FIG. 3), as shown in FIG. 1.

The exterior case 22 accommodates the illumination unit 15, the image formation unit 16, the projection optical unit 17, the power supply unit 18, and the control unit. Although not illustrated, the exterior case 22 is formed of an upper case and a lower case.

Although not illustrated, the illumination unit 15 includes a laser light source, a wavelength converter, and other components. The illumination unit 15 includes a focusing lens that focuses blue laser light outputted as excitation light from the laser light source, causes the focused excitation light to be incident on the wavelength converter containing a phosphor, and outputs white light formed out of the blue laser light and yellow fluorescence. The illumination unit 15 does not necessarily employ the configuration using a laser light source and a wavelength converter and may employ a configuration using a laser light source alone or a configuration using an LED (light emitting diode) or a discharge-type light source lamp. The illumination unit 15 may include a heat sink or any other heat dissipation member that dissipates heat generated by the light emission source to the space outside the projector.

The image formation unit 16 includes a color separation system 3a, a light modulator 4R, which outputs red image light, a light modulator 4G, which outputs green image light, a light modulator 4B, which outputs blue image light, and a light combiner 5. The image formation unit 16 modulates the light outputted from the illumination unit 15 based on image information to generate image light. The color separation system 3a, the light modulators 4R, 4G, and 4B, and the light combiner 5 are held by predetermined holding members (not shown) to form the image formation unit 16.

The color separation system 3a separates white light WL outputted from the illumination unit 15 into red light LR, green light LG, and blue light LB. The color separation system 3a includes a first dichroic mirror 7a, a second dichroic mirror 7b, a first reflection mirror 8a, a second reflection mirror 8b, a third reflection mirror 8c, and a relay lens 8d.

The first dichroic mirror 7a separates the white light WL outputted from the illumination unit 15 into the red light LR and the mixture of the green light LG and the blue light LB. The first dichroic mirror 7a reflects the red light LR and transmits the green light LG and the blue light LB. The second dichroic mirror 7b separates the mixture of the green light LG and the blue light LB into the green light LG and the blue light LB. The second dichroic mirror 7b reflects the green light LG and transmits the blue light LB.

The first reflection mirror 8a is disposed in the optical path of the red light LR. The first reflection mirror 8a reflects the red light LR reflected off the first dichroic mirror 7a toward the light modulator 4R. The second reflection mirror 8b and the third reflection mirror 8c are disposed in the optical path of the blue light LB. The second reflection mirror 8b and the third reflection mirror 8c guide the blue light LB having passed through the second dichroic mirror 7b to the light modulator 4B.

The light modulator 4R is formed of a liquid crystal panel 4RP and polarizers (not shown) provided on the light incident side and the light exiting side of the liquid crystal panel 4RP. The light modulator 4G is formed of a liquid crystal panel 4GP and polarizers (not shown) provided on the light incident side and the light exiting side of the liquid crystal panel 4GP. The light modulator 4B is formed of a liquid crystal panel 4BP and polarizers (not shown) provided on the light incident side and the light exiting side of the liquid crystal panel 4BP.

The light modulator 4R modulates the red light LR out of the light outputted from the illumination unit 15 in accordance with an image signal. The light modulator 4G modulates the green light LG out of the light outputted from the illumination unit 15 in accordance with an image signal. The light modulator 4B modulates the blue light LB out of the light outputted from the illumination unit 15 in accordance with an image signal. The light modulators 4R, 4G, and 4B thus form image light LL corresponding to the red light, the green light, and the blue light.

A field lens 9R, which parallelizes the red light LR to be incident on the light modulator 4R, is provided on the light incident side of the light modulator 4R. A field lens 9G, which parallelizes the green light LG to be incident on the light modulator 4G, is provided on the light incident side of the light modulator 4G. A field lens 9B, which parallelizes the blue light LB to be incident on the light modulator 4B, is provided on the light incident side of the light modulator 4B.

The light combiner 5 is formed of a cross dichroic prism having a substantially cubic shape. The light combiner 5 combines the red light, the green light, and the blue light from the light modulators 4R, 4G, and 4B with one another into the image light LL. The light combiner 5 outputs the image light LL toward the projection optical unit 17.

The projection optical unit 17 enlarges the image light LL outputted from the image formation unit 16 and projects the enlarged image light LL onto a screen (not shown). When the image light LL is projected from the projection optical unit 17, a color image is displayed on the screen. The screen is disposed in front (on side +X) of the projector 10 shown in FIG. 1.

The projection optical unit 17 in the present embodiment is linked in the direction +X to the image formation unit 16 via the linkage frame 32, which will be described later. The projection optical unit 17 includes a plurality of projection lenses. The number of projection lenses is not limited to a specific number.

The power supply unit 18 supplies the illumination unit 15 with electric power supplied from an external power supply coupled to the projector 10.

The control unit is formed of a circuit substrate that controls each portion of the projector 10. A variety of types of wiring are formed in the control unit, and a variety of electronic parts are incorporated in the control unit.

The light path changer 31 is disposed between the light combiner 5 of the image formation unit 16 and the projection optical unit 17. In the projector 10, the optical path changer 31 can shift the optical path of the image light LL or perform what is called a pixel shift to display an image having resolution higher than the resolution of the liquid crystal panels 4BP, 4GP, and 4RP on the screen. For example, when the liquid crystal panels 4BP, 4GP, and 4RP are liquid crystal panels that support the full high definition, an 4K image can be displayed.

A principle that allows an increase in resolution achieved by the shift of the optical path of the image light LL will be described below with reference to FIG. 2.

Figure 2:
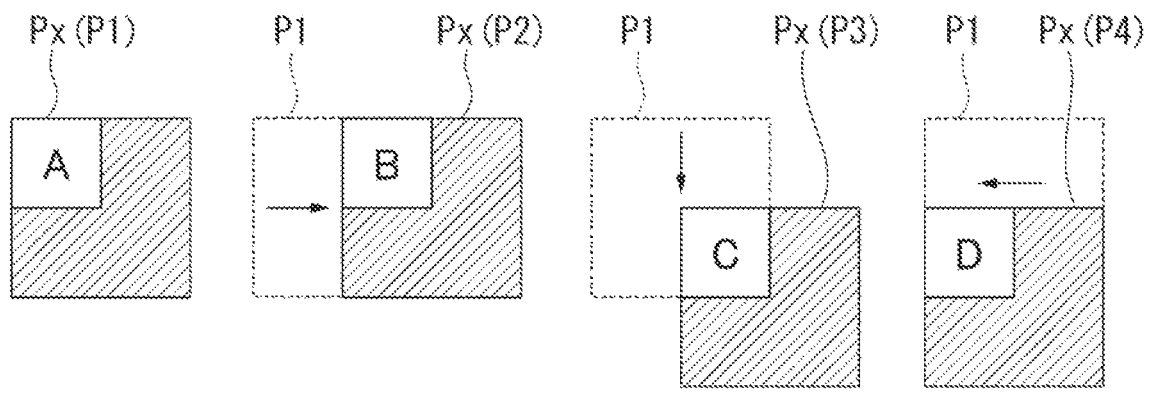
FIG. 2 describes a principle that allows an increase in resolution achieved by a pixel shift.
Figure 2:
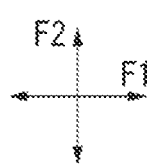
Figure 2:
Figure 2:
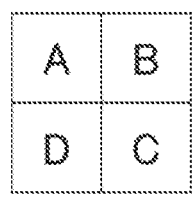

FIG. 2 is a descriptive diagram showing that an image display position is shifted by shifting the optical path of the image light LL.

The light path changer 31 includes an optical member on which the image light LL, which is the combination of the blue light, the green light, and the red light modulated by the liquid crystal panels 4BP, 4GP, and 4RP, is incident, as will be described later. The optical path changer 31 changes the orientation of a glass plate that forms the optical member to shift the optical path of the image light LL by using refraction.

The optical path changer 31 causes the optical member to swing in two directions, a first swing direction around a first swing axis K1, which intersects with an optical axis AX, and a second swing direction around a second swing axis K2, which intersects with the optical axis AX and the first swing axis K1. When the optical member swings in the first swing direction, the optical path of the light incident on the optical member is shifted in a first direction F1 shown in FIG. 2. When the optical member swings in the second swing direction, the optical path of the light incident on the optical member is shifted in a second direction F2, which intersects with the first direction F1 shown in FIG. 2. A pixel Px to be displayed on the screen is therefore displayed in a position shifted in the first direction F1 and the second direction F2, which intersects with the first direction F1.

The projector 10 combines the shift of the optical path in the first direction F1 with the shift of the optical path in the second direction F2 to increase the number of apparent pixels so as to increase the resolution of an image displayed on the screen. For example, the pixel Px is moved to the position shifted by half a pixel in the first direction F1 and the second direction F2, as shown in FIG. 2. The image display position on the screen can therefore be moved to an image display position P2, which is shifted by half a pixel from an image display position P1 along the first direction F1, to an image display position P3, which is shifted by half a pixel from the image display position P1 along the first direction F1 and the second direction F2, and to an image display position P4, which is shifted by half a pixel from the image display position P1 along the second display F2. FIG. 2 shows the shift operation flow from A to B to C to D, focusing on a quarter of the area of a pixel Px.

The optical path shift operation is so performed that an image is displayed for a fixed period in each of the image display positions P1, P2, P3, and P4 to change the content displayed on the liquid crystal panels 4BP, 4GP, and 4RP in synchronization with the optical path shift operation, as shown in FIG. 2. Pixels A, B, C, and D each having a size apparently smaller than the pixel Px can therefore be displayed. For example, to display the pixels A, B, C, and D as a whole at a frequency of 60 Hz, the liquid crystal panels 4BP, 4GP, and 4RP each need to display images at a speed four times faster than the speed in the normal-resolution display operation in correspondence to the image display positions P1, P2, P3, and P4. That is, the display frequency or what is called a refreshing rate at which the liquid crystal panels 4BP, 4GP, and 4RP operate is 240 Hz.

In the example shown in FIG. 2, the first direction F1 and the second direction F2 are perpendicular to each other and are the directions in which the pixels Px displayed in a matrix on the screen are arranged. In place of the configuration described above, the first direction F1 and the second direction F2 may not be perpendicular to each other and may incline with respect to the direction in which the pixels Px are arranged. Even when the shift direction described above is employed, combining the pixel shifts in the first direction F1 and the second direction F2 with each other as appropriate allows movement of the pixels Px to the image display positions P1, P2, P3, and P4 shown in FIG. 2. The amount of shift of the image display positions is not limited to the amount corresponding to half a pixel and may instead be, for example, a quarter of a pixel Px or three quarters of a pixel Px.

Figure 3:
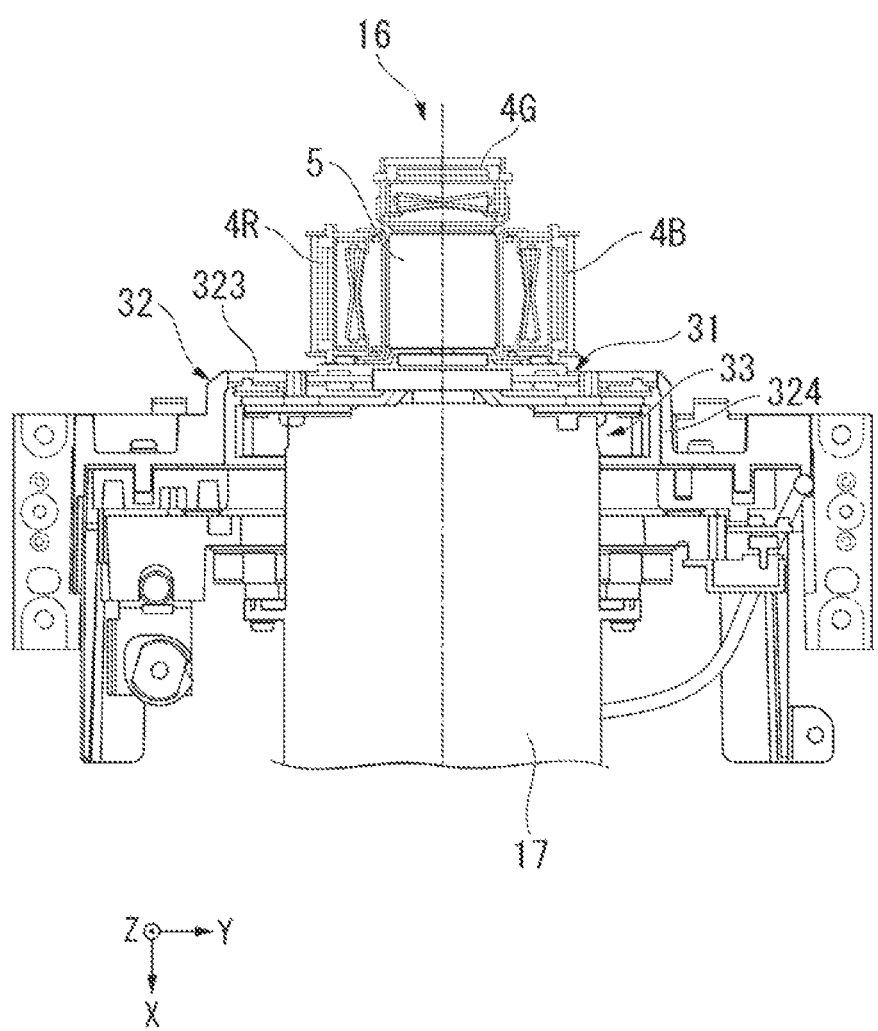
FIG. 3 is a plan view of key parts of the projector.
Figure 4:
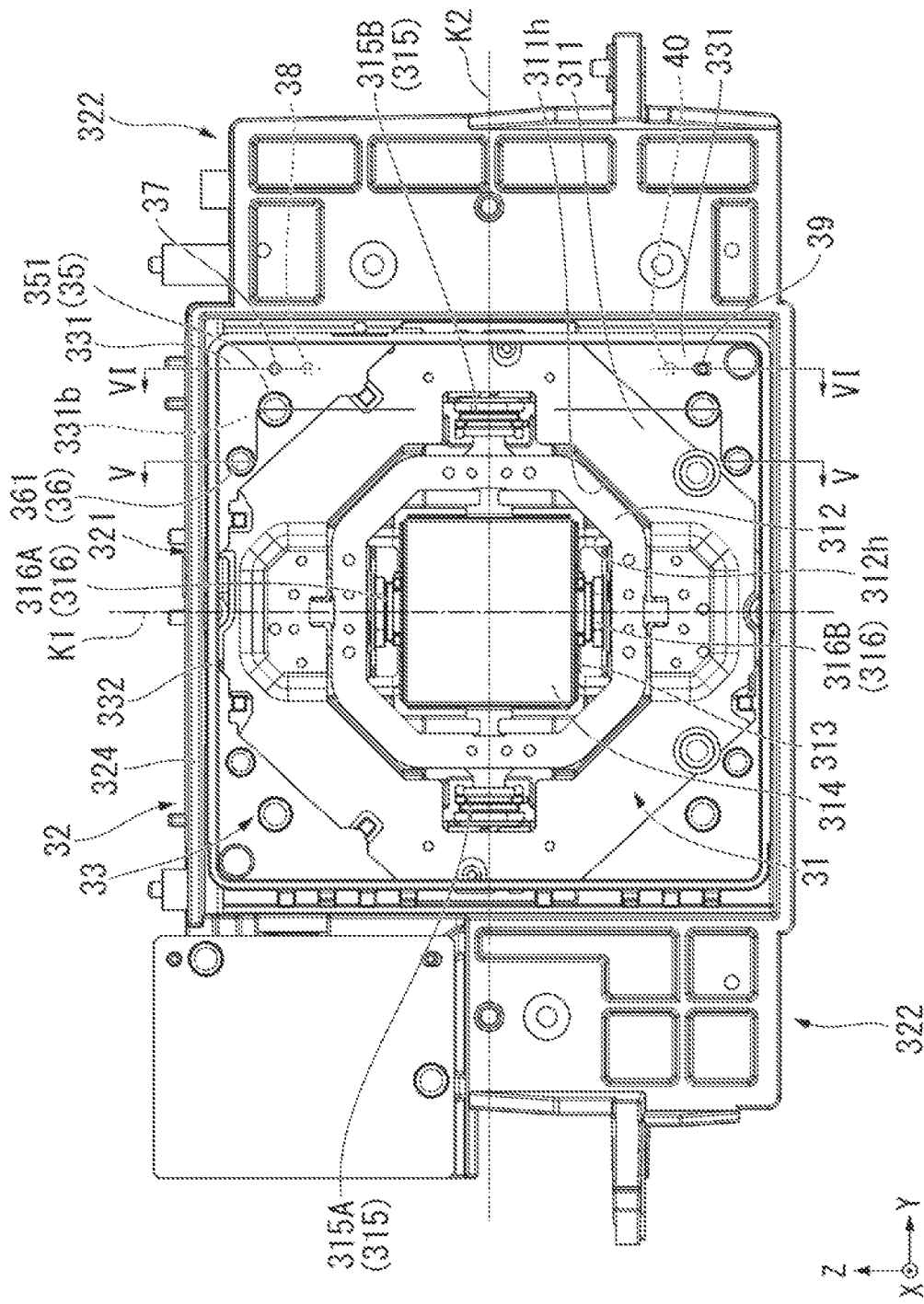
FIG. 4 is a front view showing the state in which an optical path changer is fixed to a linkage frame.
Figure 5:
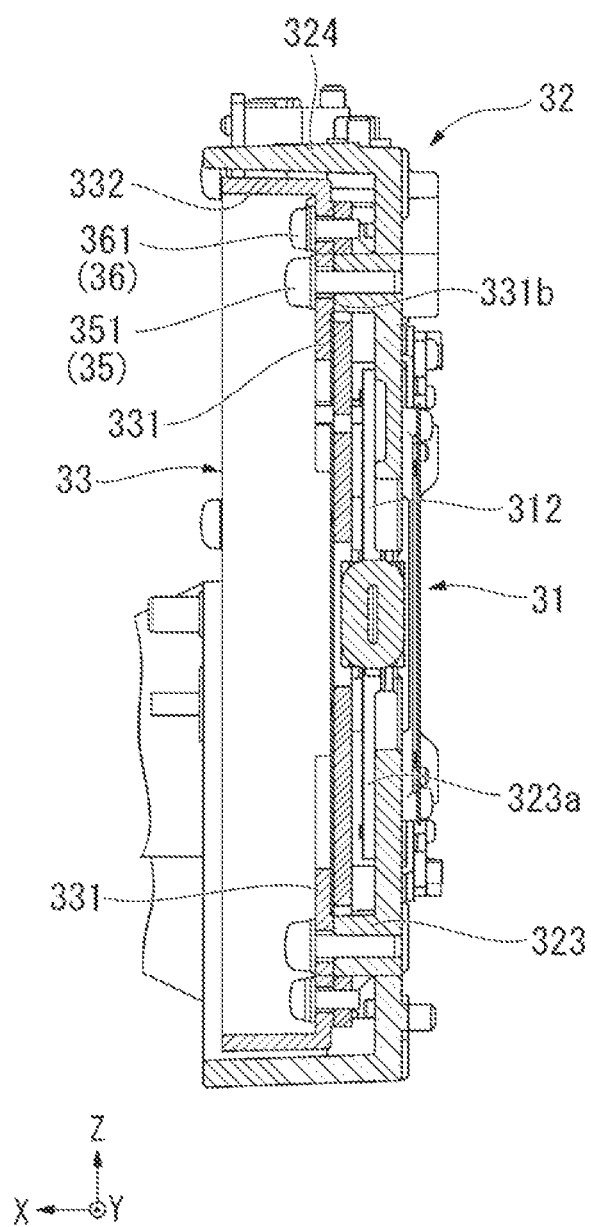
FIG. 5 is a cross-sectional view taken along the line V-V in FIG. 4.
Figure 6:
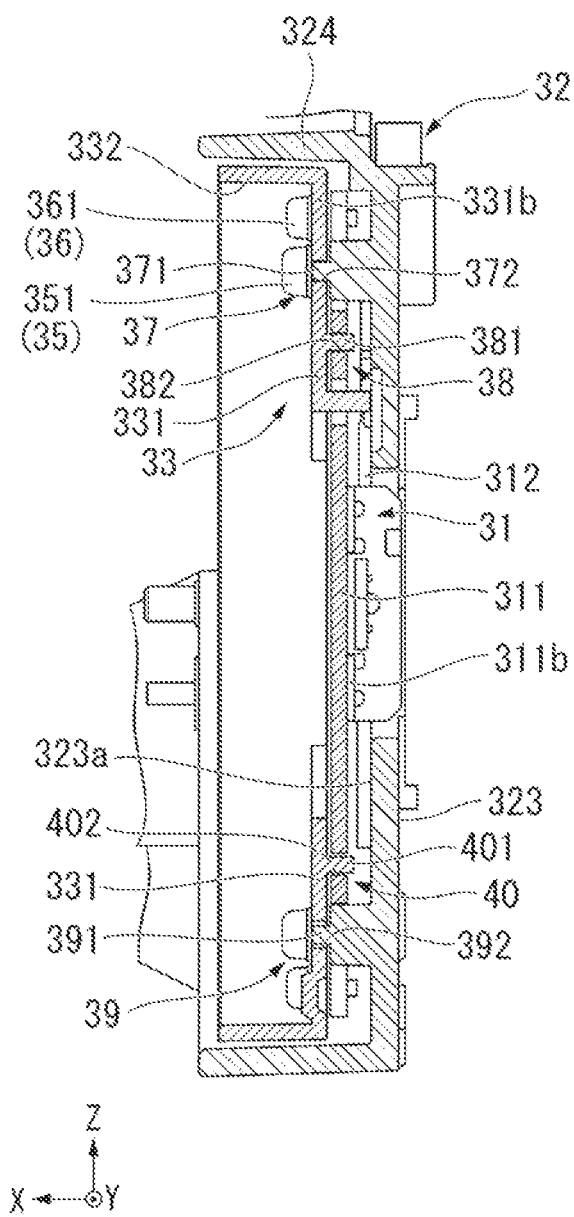
FIG. 6 is a cross-sectional view taken along the line VI-VI in FIG. 4.
Figure 7:
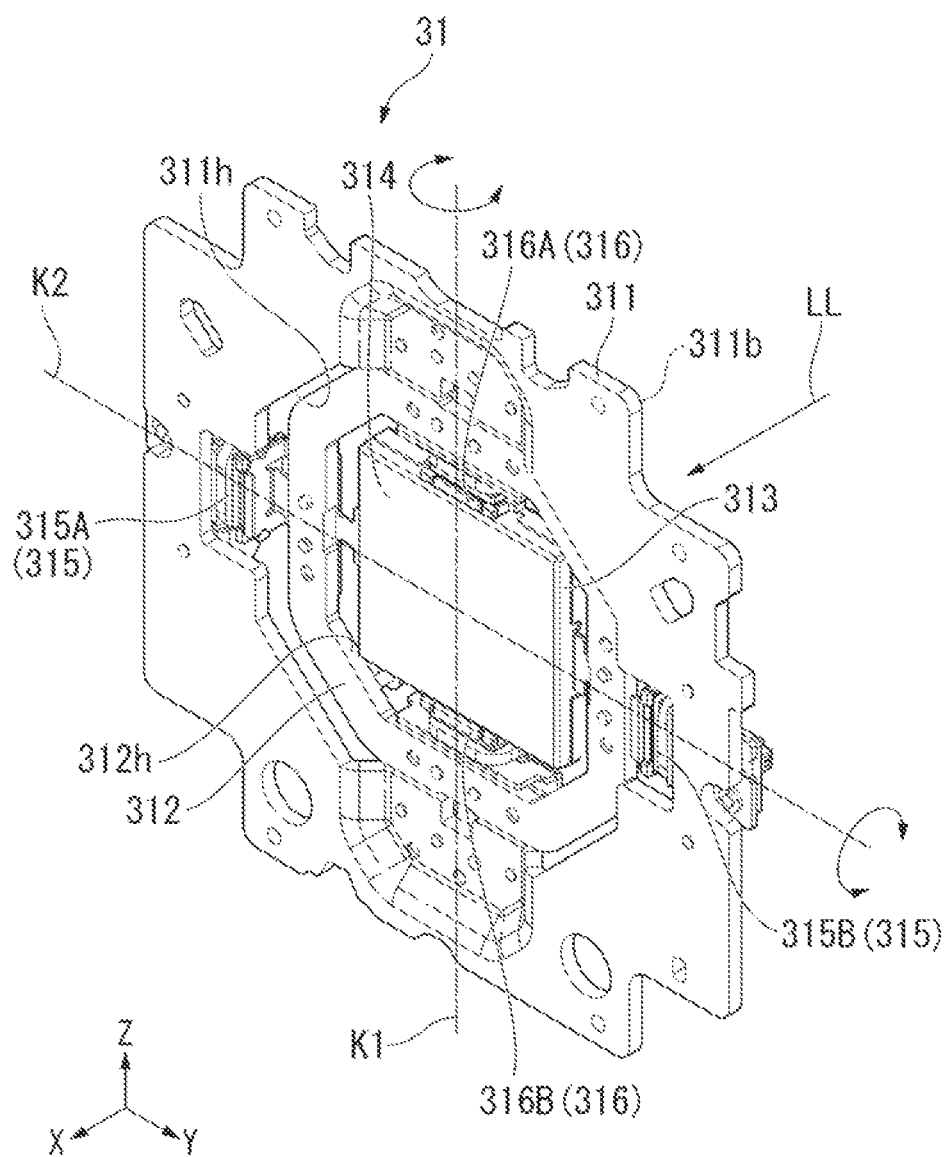
FIG. 7 is a perspective view of the optical path changer.
Figure 8:
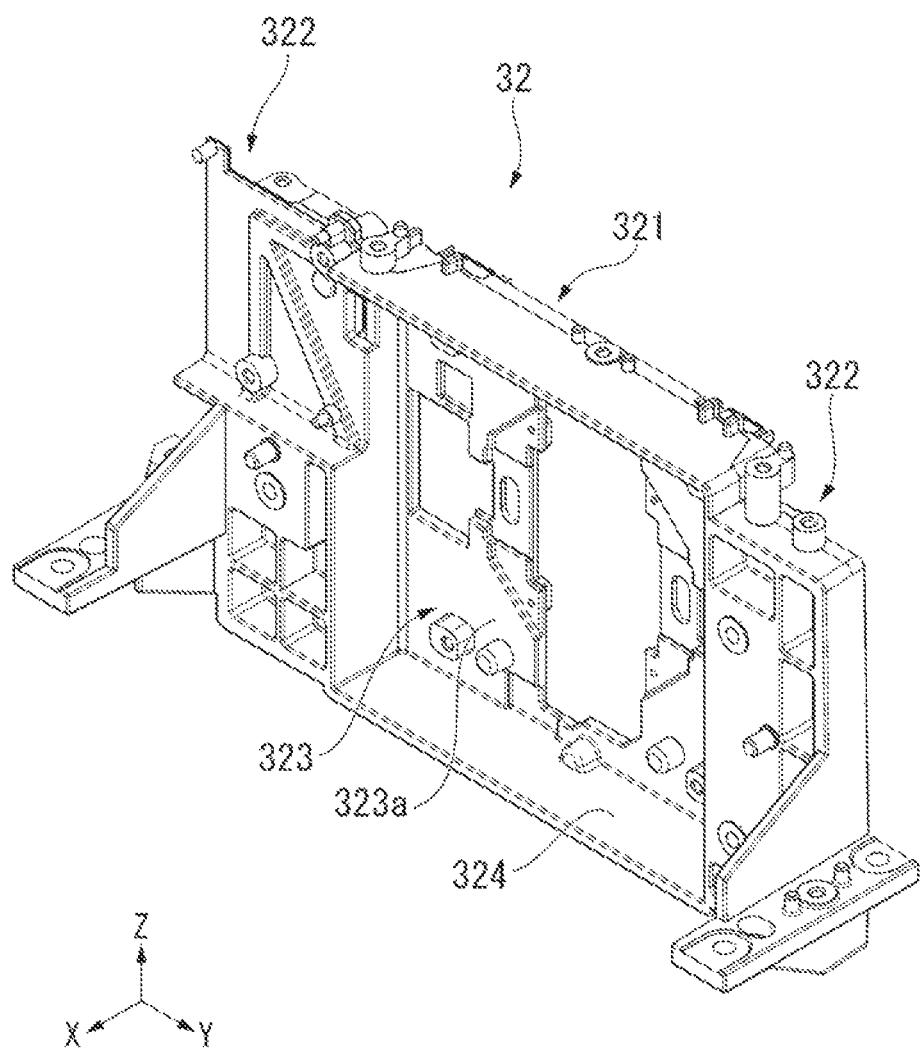
FIG. 8 is a perspective view of the linkage frame.
Figure 9:
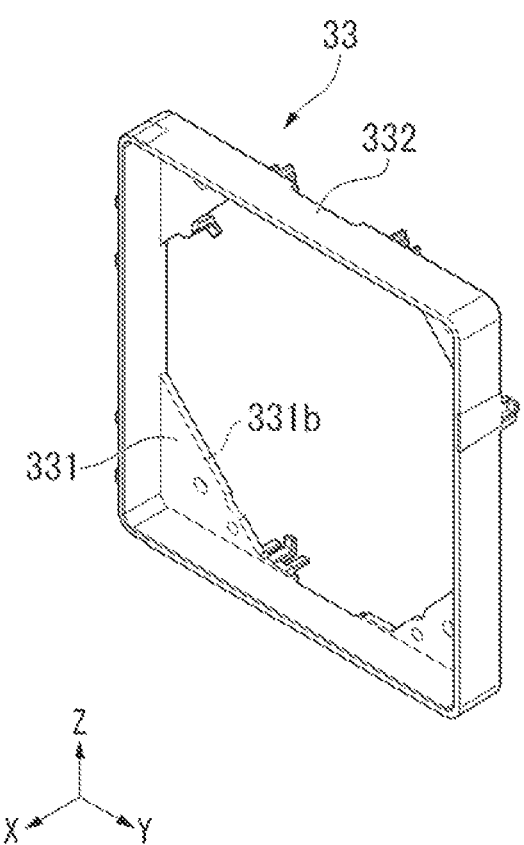
FIG. 9 is a perspective view of a vibration absorbing member.

FIG. 3 is a plan view of key parts of the projector 10. FIG. 4 is a front view showing the state in which the optical path changer 31 is fixed to the linkage frame 32. FIG. 5 is a cross-sectional view taken along the line V-V in FIG. 4. FIG. 6 is a cross-sectional view taken along the line VI-VI in FIG. 4. FIG. 7 is a perspective view of the optical path changer 31. FIG. 8 is a perspective view of the linkage frame 32. FIG. 9 is a perspective view of the vibration absorbing member 33.

The linkage frame 32 includes a linkage section 321 and fixed sections 322, which protrude from the opposite sides of the linkage section 321 along the axis Y, as shown in FIG. 8. The linkage section 321 includes a bottom plate section 323 and a wall section 324. The bottom plate section 323 is disposed so as to face the optical path changer 31. One surface of the bottom plate section 323, the surface facing the optical path changer 31, forms support surfaces 323a, which support the optical path changer 31. That is, the linkage frame 32 has the support surfaces 323a, which support the optical path changer 31. The wall section 324 is provided integrally with the bottom plate section 323 so as to protrude in the direction +X from the circumferential edges of the support surfaces 323a. The fixed sections 322 are directly or indirectly fixed to the lower case of the exterior case 22.

The linkage frame 32 links the image formation unit 16 and the projection optical unit 17 arranged along the axis-X direction to each other, as shown in FIG. 3. Furthermore, the linkage frame 32 accommodates the optical path changer 31 and the vibration absorbing member 33 in a recess formed by the bottom plate section 323 and the wall section 324, as shown in FIGS. 4, 5, and 6. That is, the linkage frame 32 links the image formation unit 16 and the projection optical unit 17 to each other with the optical path changer 31 and the vibration absorbing member 33 interposed between the image formation unit 16 and the projection optical unit 17.

The optical path changer 31 includes a base member 311, a swing frame 312, a movable frame 313, an optical member 314, a first actuator 315, and a second actuator 316, as shown in FIG. 7.

The optical path changer 31 has as swing axes the first swing axis K1, around which the swing frame 312 is caused to swing relative to the base member 311, and the second swing axis K2, around which the optical member 314 is caused to swing relative to the swing frame 312 in the direction perpendicular to the first swing axis K1. That is, the optical path changer 31 in the present embodiment is formed of a two-axis-swing-type optical path changer. In the present embodiment, the first swing axis K1 extends in the axis-Z direction, and the second swing axis K2 extends in the axis-Y direction. In the present specification, the first swing axis K1 and the second swing axis K2 each mean an imaginary axis around which the swing motion occurs.

The base member 311 is formed of a plate made, for example, of metal, and one surface 311b is disposed so as to face the support surfaces 323a of the linkage frame 32. The base member 311 has an opening 311h having a substantially octagonal shape when viewed in the axis-X direction, and the swing frame 312 is disposed in the opening 311h. The base member 311 swingably supports the swing frame 312 around the first swing axis K1. That is, the swing frame 312 is swingably supported relative to the base member 311.

The swing frame 312 is formed of a plate having a substantially octagonal shape when viewed in the axis-X direction and has an opening 312h having a substantially octagonal shape when viewed in the axis-X direction. The movable frame 313, which supports the optical member 314, is disposed in the opening 312h of the swing frame 312. That is, the swing frame 312 is formed of a frame-shaped member that surrounds the movable frame 313. The swing frame 312 thus supports the optical member 314 via the movable frame 313. The swing frame 312 supports the movable frame 313 so as to be swingable around the second swing axis K2. That is, the movable frame 313 is swingably supported relative to the swing frame 312.

The movable frame 313 is formed of a quadrangular frame-shaped member when viewed in the axis-X direction. The movable frame 313 supports the optical member 314 in its frame-shaped member.

The optical member 314 is formed of a light-transmissive glass plate. The glass plates is not necessarily made of a specific material and is made of any of a variety of glass materials, such as white plate glass, borosilicate glass, and quartz glass. A glass plate is used as the optical member 314 in the present embodiment, but the optical member 314 only needs to be made of a material that transmits light and refracts the image light LL. The optical member 314 is therefore not necessarily made of glass and may instead be made of any of a variety of crystal materials, such as quartz and sapphire, or any of a variety of resin materials, such as polycarbonate-based resin and acrylic resin. An antireflection film may be formed at each of the light incident surface and the light exiting surface of the glass plate.

The optical path changer 31 causes the swing fame 312 and the movable frame 313 to swing around a reference position where the direction of a normal to the optical member 314 supported by the movable frame 313 coincide with the optical axis of the image light LL incident on the optical path changer 31. The angle of incidence of the image light incident on the optical member 314 is 0° at the reference position. The swing motion, however, does not necessarily occur around the reference position. Furthermore, the angle of incidence of the image light incident on the optical member 314 may not necessarily be 0° at the reference position.

The first actuator 315 includes two magnetic drivers 315A and 315B. The two magnetic drivers 315A and 315B are provided in the opening 311h of the base member 311 in positions where the drivers face each other along the axis-Y direction. The magnetic drivers 315A and 315B include magnets and coils disposed at a predetermined distance in the axis-Y direction. The magnets are fixed to the swing frame 312, and the coils are fixed to the base member 311. When the coils are energized, the magnets move in the axis-X direction relative to the coils. The first actuator 315 thus exerts a driving force around the first swing axis K1 on the swing frame 312 swingably supported by the base member 311. At this point, the coils of the two magnetic drivers 315A and 315B are energized in synchronization with each other and exert driving forces in the same swing direction on the swing frame 312. The first actuator 315 thus causes the swing frame 312 to swing.

The second actuator 316 includes two magnetic drivers 316A and 316B. The two magnetic drivers 316A and 316B are provided in the opening 312h of the swing frame 312 in positions where the drivers face each other along the axis-Z direction. The magnetic drivers 316A and 316B include magnets and coils disposed at a predetermined distance in the axis-Z direction. The magnets are fixed to the movable frame 313, and the coils are fixed to the swing frame 312. When the coils are energized, the magnets move in the axis-X direction relative to the coils. The second actuator 316 thus exerts a driving force around the second swing axis K2 on the movable frame 313. At this point, the coils of the two magnetic drivers 316A and 316B are energized in synchronization with each other and exert driving forces in the same swing direction on the movable frame 313. The second actuator 316 thus causes the movable frame 313 to swing.

The magnetic drivers of the first actuator 315 and the second actuator 316 are the two magnetic drivers 315A and 315B and the two magnetic drivers 316A and 316B, respectively, and the first actuator 315 and the second actuator 316 can each instead be formed of a single magnetic driver. Still instead, one of the actuators can be formed of one magnetic driver, and the other actuator can be formed of two magnetic drivers. The first actuator 315 and the second actuator 316 are each not limited to a magnetically driven apparatus and can each be an actuator based on any of a variety of other methods.

The vibration absorbing member 33 includes vibration absorbing sections 331 and a wall section 332 integrated with the vibration absorbing sections 331, as shown in FIG. 9. The wall section 332 is formed of a quadrangular-frame-shaped member when viewed in the axis-X direction and protrudes in the axis-X direction, which intersects with vibration absorbing surfaces 331b. The vibration absorbing sections 331 are formed of substantially-triangular-shaped sections provided at the four inside corners of the wall section 332.

Part of the surface 331b of each of the vibration absorbing sections 331 is in contact with the support surfaces 323a of the linkage frame 32, and the other part of the surface 331b is in contact with the base member 311 of the optical path changer 31, as shown in FIGS. 5 and 6. That is, the vibration absorbing member 33 has the vibration absorbing surfaces 331b interposed between the support surfaces 323a of the linkage frame 32 and the base member 311 of the optical path changer 31. The support surfaces 323a of the linkage frame 32 and the base member 311 of the optical path changer 31 are located on the side facing the vibration absorbing surfaces 331b of the vibration absorbing member 33, but the support surfaces 323a of the linkage frame 32 and the base member 311 of the optical path changer 31 are not in direct contact with each other. The support surfaces 323a of the linkage frame 32 therefore indirectly support the optical path changer 31 via the vibration absorbing member 33. The vibration absorbing member 33 thus absorbs the vibration generated by the optical path changer 31. In FIGS. 5 and 6, the wall section 332 is separate from the wall section 324 of the linkage frame 32, but the wall section 332 may be in contact with the wall section 324 of the linkage frame 32.

The linkage frame 32 is made of a metal material, for example, aluminum. In contrast, the vibration absorbing member 33 is made of an elastic resin material, for example, rubber and polycarbonate. The rigidity of the vibration absorbing member 33 is therefore lower than the rigidity of the linkage frame 32.

The first swing axis K1 extends in parallel to an edge of the wall section 332 of the vibration absorbing member 33, the edge extending in the axis-Z direction, as shown in FIG. 4. The second swing axis K2 extends in parallel to another edge of the wall section 332 of the vibration absorbing member 33, the edge extending in the axis-Y direction. In contrast, since the vibration absorbing sections 331 are located at the four corners of the wall section 332, the vibration absorbing surfaces 331b are located in positions in the directions inclining by an angle of 45° with respect to the first swing axis K1 and second swing axis K2. That is, the vibration absorbing surfaces 331b are located between the first swing axis K1 and the second swing axis K2. Furthermore, the vibration absorbing surfaces 331b are located between the first actuator 315 and the second actuator 316.

The vibration absorbing sections 331 are each provided with a first fixing section 35, which fixes the vibration absorbing member 33 to the linkage frame 32, as shown in FIG. 4. The first fixing sections 35 each include a screw 351, and the screws 351 are inserted through the vibration absorbing member 33 into the bottom plate section 323 of the linkage frame 32, so that the vibration absorbing member 33 is fixed to the linkage frame 32 with the screws, shown in FIG. 5. That is, the first fixing sections 35 are located at the support surface 323a of the linkage frame 32, which are located between the first swing axis K1 and the second swing axis K2. Furthermore, the first fixing sections 35 are located at the support surfaces 323a of the linkage frame 32, which are located between the first actuator 315 and the second actuator 316.

The first fixing sections 35 in the present embodiment correspond to the fixing section in the claims.

The vibration absorbing sections 331 are each provided with a second fixing section 36, which fixes the vibration absorbing member 33 to the optical path changer 31, as shown in FIG. 5. The second fixing sections 36 each include a screw 361, as the first fixing sections, and the screws 361 are inserted through the vibration absorbing member 33 into the base member 311 of the optical path changer 31, so that the vibration absorbing member 33 is fixed to the base member 311 with the screws.

Out of the vibration absorbing sections 331 provided at the four corners of the vibration absorbing member 33, the vibration absorbing section 331 located at the upper right corner in FIG. 4 includes a first positioner 37 and a second positioner 38, as shown in FIG. 6. That is, the projector 10 further includes the first positioner 37, which positions the linkage frame 32 and the vibration absorbing member 33 with respect to each other, and the second positioner 38, which positions the base member 311 of the optical path changer 31 and the vibration absorbing member 33 with respect to each other.

The first positioner 37 is formed of a pin 371, which protrudes from the bottom plate section 323 of the linkage frame 32 toward the side +X, and a hole 372, which is provided in the vibration absorbing section 331. When the pin 371 provided in the linkage frame 32 is inserted into the hole 372 in the vibration absorbing section 331, the linkage frame 32 and the vibration absorbing member 33 are positioned with respect to each other in the plane YZ. In FIG. 6, the screws 351 of the first fixing section 35 are drawn as if they are located on the first positioner 37 but are actually disposed in positions separate from one another in the depth direction of the figure.

The second positioner 38 is formed of a pin 381, which protrudes from the vibration absorbing section 331 toward the side −X, and a hole 382, which is provided in the base member 311 of the optical path changer 31. When the pin 381 provided in the vibration absorbing section 331 is inserted into the hole 382 in the base member 311, the vibration absorbing member 33 and the base member 311 of the optical path changer 31 are positioned with respect to each other in the plane YZ.

Out of the four vibration absorbing sections 331 provided at the four corners of the vibration absorbing member 33, the vibration absorbing section 331 located at the lower right corner in FIG. 4 is provided with a first rotation restrictor 39, which restricts the rotation of the linkage frame 32 and the vibration absorbing member 33 relative to each other. That is, the projector 10 further includes the first rotation restrictor 39, which restricts the rotation of the linkage frame 32 and the vibration absorbing member 33 relative to each other. The first rotation restrictor 39 is formed of a pin 391, which protrudes from the linkage frame 32 toward the side +X, and a hole 392, which is provided in the vibration absorbing section 331, as shown in FIG. 6. When the pin 391 provided in the linkage frame 32 is inserted into the hole 392 in the vibration absorbing section 331, the rotation of the linkage frame 32 and the vibration absorbing member 33 relative to each other in the plane YZ is restricted.

Out of the four vibration absorbing sections 331 provided at the four corners of the vibration absorbing member 33, the vibration absorbing section 331 located at the lower right corner in FIG. 4 is further provided with a second rotation restrictor 40, which restricts the rotation of the optical path changer 31 and the vibration absorbing member 33 relative to each other. That is, the projector 10 further includes the second rotation restrictor 40, which restricts the rotation of the optical path changer 31 and the vibration absorbing member 33 relative to each other. The second rotation restrictor 40 is formed of a pin 401, which protrudes from the vibration absorbing section 331 toward the side −X, and a hole 402, which is provided in the base member 311 of the optical path changer 31, as shown in FIG. 6. When the pin 401 provided in the vibration absorbing section 331 is inserted into the hole 402 in the base member 311, the rotation of the optical path changer 31 and the vibration absorbing member 33 relative to each other in the plane YZ is restricted.

Effects of First Embodiment

The projector 10 according to the present embodiment includes the illumination unit 15, the image formation unit 16, which modulates the light outputted from the illumination unit 15 to generate the image light LL, the projection optical unit 17, which projects the image light LL outputted from the image formation unit 16, the optical path changer 31, which is provided between the image formation unit 16 and the projection optical unit 17 and changes the optical path of the image light LL outputted from the image formation unit 16, the linkage frame 32, which links the image formation unit 16 and the projection optical unit 17 to each other, and the vibration absorbing member 33, which absorbs the vibration generated by the optical path changer 31. The optical path changer 31 includes the base member 311, the optical member 314, on which the image light LL outputted from the image formation unit 16 is incident, and the swing frame 312, which supports the optical member 314 and is swingably supported relative to the base member 311. The linkage frame 32 has the support surfaces 323a, which support the optical path changer 31. The vibration absorbing member 33 has the vibration absorbing surfaces 331b, which are in contact with the support surfaces 323a of the linkage frame 32 and the base member 311 of the optical path changer 31.

As described above, the projector 10 according to the present embodiment includes the vibration absorbing member 33, and the vibration absorbing surfaces 331b of the vibration absorbing member 33 are in contact with the support surfaces 323a of the linkage frame 32 and the base member 311 of the optical path changer 31. The vibration absorbing member 33 can therefore absorb the vibration generated by the optical path changer 31 via the vibration absorbing surfaces 331b and effectively suppress propagation of the vibration to the linkage frame 32 without preventing the optical path changer 31 from operating. A projector 10 that projects a high-resolution image and excels in quietness can thus be achieved. Furthermore, since the vibration absorber needs no thickness, that is, no dimension in the direction in which the image formation unit 16 is linked to the projection optical unit 17, an increase in size of the projector 10 can be suppressed.

In the projector 10 according to the present embodiment, the linkage frame 32 includes the wall section 324, which protrudes from the circumferential edges of the support surfaces 323a. The vibration absorbing member 33 includes the wall section 332, which protrudes in a direction that intersects with the vibration absorbing surfaces 331b but is not in contact with the wall section 324 of the linkage frame 32.

According to the configuration described above, since the wall section 324 and the wall section 332 do not interfere with each other in the assembly of the projector, no management of the dimensions of the two wall sections is necessary, whereby the assembly efficiency is improved.

In the projector 10 according to the present embodiment, the linkage frame 32 includes the wall section 324, which protrudes from the circumferential edges of the support surfaces 323a. The vibration absorbing member 33 may include the wall section 332, which protrudes in a direction that intersects with the vibration absorbing surfaces 331b and is in contact with the wall section 324 of the linkage frame 32.

According to the configuration described above, the vibration absorbing member 33 can suppress the propagation of the vibration to the linkage frame 32 not only by utilizing the support surfaces 323a of the linkage frame 32 but utilizing the wall section 332, which protrudes from the circumferential edges of the support surfaces 323a. The vibration propagation suppression effect provided by the vibration absorbing member 33 can therefore be further enhanced.

The wall section 324 of the linkage frame 32 and the wall section 332 of the vibration absorbing member 33 may be in contact with each other throughout the four circumferential edges of the support surfaces 323a or at part of the four edges. The contact is desirably made at part of the four edges instead of the entire four edges, for example, in consideration of positioning errors between the linkage frame 32 and the vibration absorbing member 33, a difference in coefficient of thermal expansion thereof, and other factors. In this case, it is desirable to achieve the contact in the vicinity of the actuators and the swing axes where the vibration tends to be large. At least one location where the contact occurs allows enhancement of the vibration propagation suppression effect.

In the projector 10 according to the present embodiment, the optical path changer 31 has the first swing axis K1, around which the swing frame 312 is caused to swing relative to the base member 311, and the second swing axis K2, around which the optical member 314 is caused to swing relative to the swing frame 312 in the direction perpendicular to the first swing axis K1. The vibration absorbing surfaces 331b of the vibration absorbing member 33 are located between the first swing axis K1 and the second swing axis K2.

In the present embodiment, the vibration of the optical member 314 propagates from a portion on the first swing axis K1, the portion where the swing frame 312 and the base member 311 are coupled to each other. The vibration of the first actuator 315 fixed to a portion of the base member 311, the portion on the second swing axis K2, propagates in the direction of the second swing axis K2. The vibration of the second actuator 316 fixed to a portion of the base member 311, the portion on the first swing axis K1, propagates in the direction of the first swing axis K1. It is desirable that the vibration absorbing surfaces 331b are located in the vicinity of the vibration sources or in a portion between the vibration sources, the portion where the vibration is maximized. Therefore, according to the configuration described above, the vibration absorbing surfaces 331b of the vibration absorbing member 33 are disposed at portions where the vibration propagating along the first swing axis K1 and the second swing axis K2 is maximized, whereby the vibration propagation suppression effect can be further enhanced. The vibration absorbing surfaces 331b may not be located between the first swing axis K1 and the second swing axis K2 and may, for example, be provided at four locations: the upper and lower sides on the first swing axis K1 and the right and left sides on the second swing axis K2 shown in FIG. 4.

In the projector 10 according to the present embodiment, the first fixing section 35, which fixes the linkage frame 32 and the vibration absorbing member 33 to each other, is provided, and the first fixing section 35 is located at one of the support surfaces 323a of the linkage frame 32 that is located between the first swing axis K1 and the second swing axis K2.

According to the configuration described above, the linkage frame 32 and the vibration absorbing member 33 can be reliably fixed to each other by the first fixing section 35 at a portion downstream of the portion where the vibration is absorbed by the vibration absorbing member 33.

In the projector 10 according to the present embodiment, the optical path changer 31 includes the movable frame 313, which supports the optical member 314 and has the first swing axis K1, around which the swing frame 312 is caused to swing relative to the base member 311, and the second swing axis K2, around which the optical member 314 is caused to swing relative to the swing frame 312 in the direction perpendicular to the first swing axis K1, the first actuator 315, which causes the swing frame 312 to swing, and the second actuator 316, which causes the movable frame 313 to swing. The vibration absorbing surfaces 331b of the vibration absorbing member 33 are located between the first actuator 315 and the second actuator 316.

According to the configuration described above, the vibration absorbing surfaces 331b of the vibration absorbing member 33 are disposed at the portions where the vibration propagating from the first actuator 315 and the second actuator 316, which are the vibration sources, is maximized, whereby the vibration propagation suppression effect can be further enhanced.

In the projector 10 according to the present embodiment, the first fixing section 35, which fixes the linkage frame 32 and the vibration absorbing member 33 to each other, is provided, and the first fixing section 35 is located at one of the support surfaces 323a of the linkage frame 32 that is located between the first actuator 315 and the second actuator 316.

According to the configuration described above, the linkage frame 32 and the vibration absorbing member 33 are fixed to each other by the first fixing section 35 at the portion where the vibration propagating from the first actuator 315 and the second actuator 316, which are the vibration sources, is maximized, whereby the vibration absorbing effect can be enhanced.

In the projector 10 according to the present embodiment, the rigidity of the vibration absorbing member 33 is lower than the rigidity of the linkage frame 32.

According to the configuration described above, the vibration absorbing member 33 can effectively suppress the propagation of the vibration to the linkage frame 32.

The projector 10 according to the present embodiment further includes the first positioner 37, which positions the linkage frame 32 and the vibration absorbing member 33 with respect to each other, and the second positioner 38, which positions the base member 311 of the optical path changer 31 and the vibration absorbing member 33 with respect to each other.

According to the configuration described above, since the linkage frame 32 and the optical path changer 31 are positioned with respect to each other via the vibration absorbing member 33, the linkage frame 32 and the optical path changer 31 can be positioned with respect to each other with the vibration absorption function ensured. Furthermore, since the vibration absorbing member 33 has both the vibration absorption function and the positioning function, it is not necessary to increase the number of parts, whereby the configuration of the projector can be simplified.

The projector 10 according to the present embodiment further includes the first rotation restrictor 39, which restricts the rotation of the linkage frame 32 and the vibration absorbing member 33 relative to each other.

According to the configuration described above, the rotation of the linkage frame 32 and the vibration absorbing member 33 relative to each other is restricted, whereby the vibration propagation suppression effect can be maintained.

The projector 10 according to the present embodiment further includes the second rotation restrictor 40, which restricts the rotation of the optical path changer 31 and the vibration absorbing member 33 relative to each other.

According to the configuration described above, the rotation of the optical path changer 31 and the vibration absorbing member 33 relative to each other is restricted, whereby the vibration propagation suppression effect can be maintained.

Second Embodiment

A second embodiment of the present disclosure will be described below with reference to FIGS. 10 and 11.

The projector according to the second embodiment has the same configuration as that of the projector according to the first embodiment but differs therefrom in terms of the peripheral configuration of the optical path changer. The overall configuration of the projector will therefore not be described.

Figure 10:
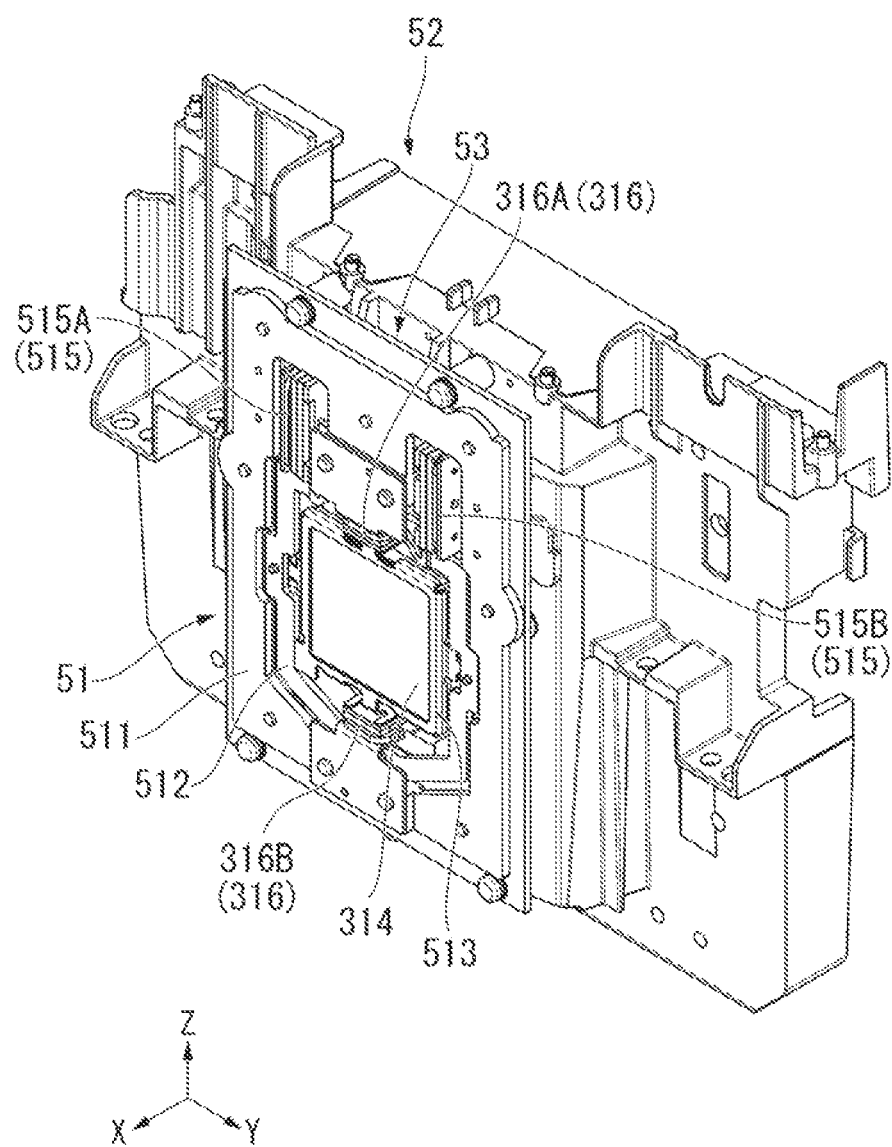
FIG. 10 is a perspective view of key parts of the projector according to a second embodiment.

FIG. 10 is a perspective view of key parts of the projector according to the second embodiment. FIG. 11 is an exploded perspective view of the components shown in FIG. 10.

Figure 11:
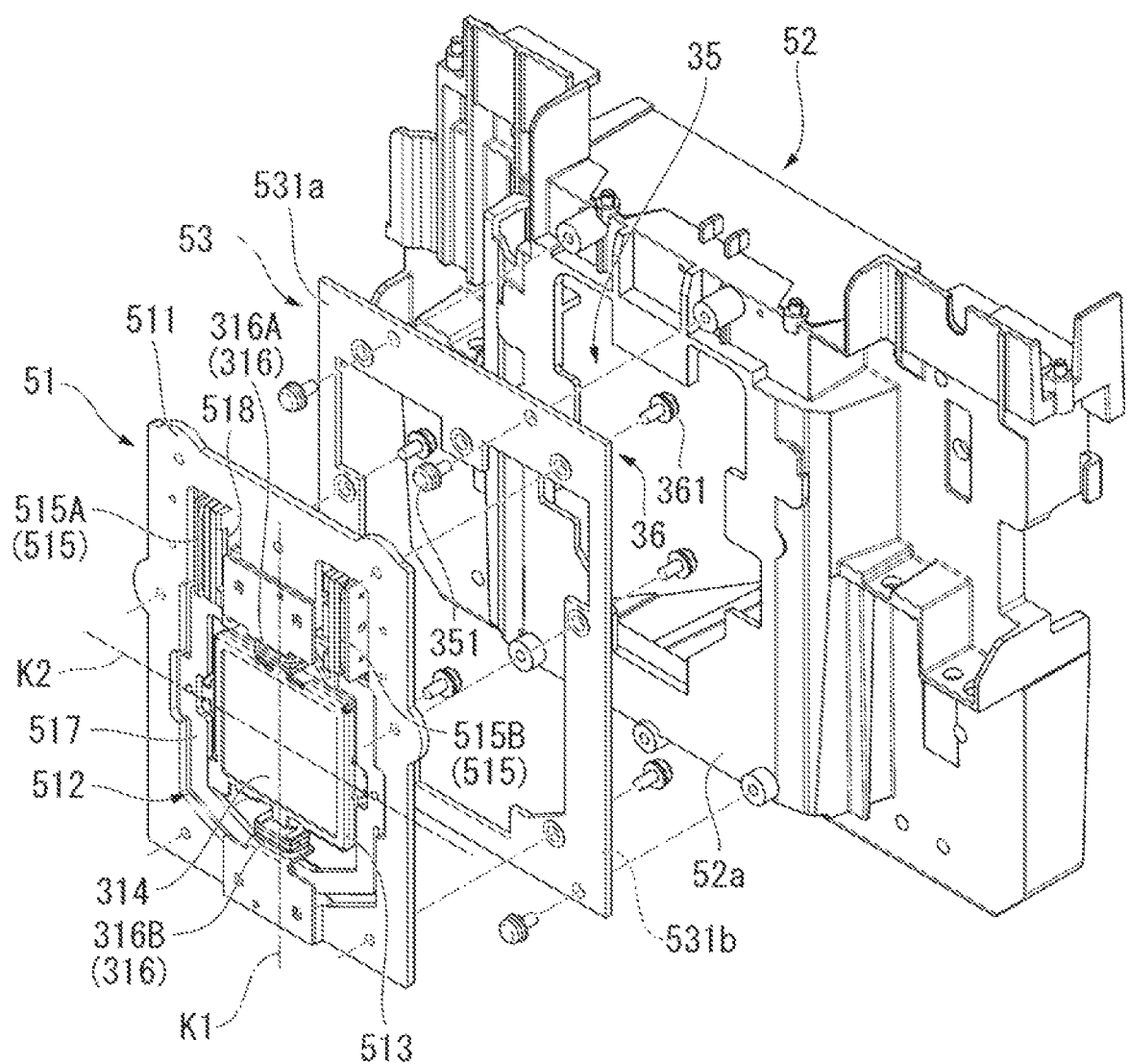
FIG. 11 is an exploded perspective view of the components shown in FIG. 10.

In FIGS. 10 and 11, components common to those in the figures used in the first embodiment have the same reference characters and will not be described.

The projector according to the present embodiment includes the illumination unit, the image formation unit, the projection optical unit, an optical path changer 51, a linkage frame 52, and a vibration absorbing member 53, as shown in FIGS. 10 and 11, as the projector according to the first embodiment does. FIGS. 10 and 11 do not show the illumination unit, the image formation unit, and the projection optical unit.

The optical path changer 51 includes a base member 511, a swing frame 512, a movable frame 513, the optical member 314, a first actuator 515, and the second actuator 316. The base member 511, the swing frame 512, the movable frame 513, and other components have the same basic configurations as those in the first embodiment but differ in terms of the shapes and the detailed configurations from those in the first embodiment. The optical path changer 51 in the present embodiment greatly differs from the optical path changer 31 in the first embodiment in terms of the position of the first actuator 515, which causes the swing frame 512 to swing.

In the optical path changer 31 in the first embodiment, the two magnetic drivers 315A and 315B, which form the first actuator 315, are disposed on the second swing axis K2. In contrast, in the optical path changer 51 in the present embodiment, two magnetic drivers 515A and 515B, which form the first actuator 515, are disposed in positions shifted upward from the second swing axis K2. Specifically, the swing frame 512 includes a frame 517, which surrounds the movable frame 513, and a support 518, which protrudes upward from the frame 517. The two magnetic drivers 515A and 515B are disposed in positions where the two drivers face each other in the axis-Y direction with the support 518 interposed therebetween.

The vibration absorbing member 53 is sandwiched between the linkage frame 52 and the base member 511 of the optical path changer 51. In the present embodiment, the vibration absorbing member 53 is formed of an annular plate having an opening 53h and has no wall section protruding from a vibration absorbing surface 531a. The vibration absorbing member 53 is provided with the first fixing sections 35, which fix the linkage frame 52 and the vibration absorbing member 53 to each other, and the second fixing sections 36, which fix the vibration absorbing member 53 and the optical path changer 51 to each other.

A support surface 52a of the linkage frame 52, the surface that supports the optical path changer 51, does not directly support the optical path changer 51 but indirectly supports the optical path changer 51 via the vibration absorbing member 53. The vibration absorbing surface 531a of the vibration absorbing member 53 is in contact with a base member 511 of the optical path changer 51. The linkage frame 52 is in contact with a surface 531b of the vibration absorbing member 53, the surface opposite from the vibration absorbing surface 531a.

The other configurations of the projector are the same as those of the projector according to the first embodiment.

Effects of Second Embodiment

Also in the projector according to the present embodiment, the same effects as those provided by the first embodiment are provided, for example, the propagation of the vibration from the optical path changer 51 to the linkage frame 52 can be effectively suppressed, a projector that projects a high-resolution image and excels in quietness can be achieved, and the small thickness of the vibration absorber allows suppression of an increase in size of the projector.

The technical scope of the present disclosure is not limited to the embodiments described above, and a variety of changes can be made thereto to the extent that the changes do not depart from the substance of the present disclosure.

For example, in the embodiments described above, the support surface of the linkage frame, the surface that supports the optical path changer, is provided on the side facing the projection optical unit, and the support surface may instead be provided on the side facing the image formation unit. The optical path changer in the embodiments described above is formed of a two-axis-swing-type optical path changer, and the present disclosure is also applicable to a projector including a one-axis-swing-type optical path changer.

The aforementioned embodiments have been described with reference to the case where the present disclosure is applied to a projector using liquid crystal panels as the light modulators, but not necessarily. The present disclosure may be applied to a projector using a digital micromirror devices as the light modulators.

In addition to the above, the number, arrangement, shape, material, and other specific factors of the variety of components that form the projector are not limited to those in the embodiments described above and can be changed as appropriate.

A projector according to an aspect of the present disclosure may have the configuration below.

The projector according to the aspect of the present disclosure includes an illumination unit, an image formation unit that modulates light outputted from the illumination unit to generate the image light, a projection optical unit that projects the image light outputted from the image formation unit, an optical path changer that is provided between the image formation unit and the projection optical unit and changes the optical path of the image light outputted from the image formation unit, a linkage frame that links the image formation unit and the projection optical unit to each other, and a vibration absorbing member that absorbs vibration generated by the optical path changer. The optical path changer includes a base member, an optical member on which the image light outputted from the image formation unit is incident, and a swing frame that supports the optical member and is swingably supported relative to the base member. The linkage frame has support surfaces. The vibration absorbing member has vibration absorbing surfaces that are in contact with the base member of the optical path changer, and the vibration absorbing surfaces are in contact with the support surfaces of the linkage frame to cause the support surfaces of the linkage frame to support the optical path changer.

In the projector according to the aspect of the present disclosure, the linkage frame may include a wall section that protrudes from the circumferential edges of the support surfaces, and the vibration absorbing member may include a wall section that protrudes in a direction that intersects with the vibration absorbing surfaces and is in contact with the wall section of the linkage frame.

In the projector according to the aspect of the present disclosure, the optical path changer may have a first swing axis around which the swing frame is caused to swing relative to the base member and the second swing axis around which the optical member is caused to swing relative to the swing frame in the direction perpendicular to the first swing axis, and the vibration absorbing surfaces of the vibration absorbing member may be located between the first swing axis and the second swing axis.

In the projector according to the aspect of the present disclosure, a fixing section that fixes the linkage frame and the vibration absorbing member to each other may be provided, and the fixing section may be located at one of the support surfaces of the linkage frame that is located between the first swing axis and the second swing axis.

In the projector according to the aspect of the present disclosure, the optical path changer may include the first swing axis, around which the swing frame is caused to swing relative to the base member, a movable frame that supports the optical member and has the second swing axis, around which the optical member is caused to swing relative to the swing frame in the direction perpendicular to the first swing axis, a first actuator that causes the swing frame to swing, and a second actuator that causes the movable frame to swing. The vibration absorbing surfaces of the vibration absorbing member may be located between the first actuator and the second actuator.

In the projector according to the aspect of the present disclosure, the fixing section, which fixes the linkage frame and the vibration absorbing member to each other, is provided, and the fixing section may be located at one of the support surfaces of the linkage frame that is located between the first actuator and the second actuator.

In the projector according to the aspect of the present disclosure, the rigidity of the vibration absorbing member may be lower than the rigidity of the linkage frame.

The projector according to the aspect of the present disclosure may further include a first positioner that positions the linkage frame and the vibration absorbing member with respect to each other and a second positioner that positions the base member of the optical path changer and the vibration absorbing member with respect to each other.

The projector according to the aspect of the present disclosure may further include a first rotation restrictor that restricts the rotation of the linkage frame and the vibration absorbing member relative to each other.

The projector according to the aspect of the present disclosure may further include a second rotation restrictor that restricts the rotation of the optical path changer and the vibration absorbing member relative to each other.

In the projector according to the aspect of the present disclosure, the vibration absorbing surfaces of the vibration absorbing member, the surfaces that are in contact with the base member of the optical path changer, may be in contact with the support surfaces of the linkage frame.

In the projector according to the aspect of the present disclosure, the support surfaces of the linkage frame, the surfaces that support the optical path changer, may include a support surface that directly supports the optical path changer and a support surface that indirectly supports the optical path changer.

In the projector according to the aspect of the present disclosure, a surface of the vibration absorbing member, the surface opposite from the vibration absorbing surfaces in contact with the base member of the optical path changer, may be in contact with the support surfaces of the linkage frame.

What is claimed is:

1. A projector comprising:
an illumination unit;
an image formation unit that modulates light outputted from the illumination unit to generate image light;
a projection optical unit that projects the image light outputted from the image formation unit;
an optical path changer that is provided between the image formation unit and the projection optical unit and changes an optical path of the image light outputted from the image formation unit;
a linkage frame that links the image formation unit and the projection optical unit to each other; and
a vibration absorbing member that absorbs vibration generated by the optical path changer and is interposed between the optical path changer and the linkage frame,
wherein the optical path changer includes a base member, an optical member on which the image light outputted from the image formation unit is incident, and a swing frame that supports the optical member and is swingably supported relative to the base member by a swing axis,
the linkage frame has support surfaces, and
the vibration absorbing member has vibration absorbing surfaces that are in contact with the base member of the optical path changer, and the vibration absorbing surfaces are in contact with the support surfaces of the linkage frame to cause the support surfaces of the linkage frame to support the optical path changer.

2. The projector according to claim 1,
wherein the linkage frame includes a wall section that protrudes from circumferential edges of the support surfaces, and
the vibration absorbing member includes a wall section that protrudes in a direction that intersects with the vibration absorbing surfaces and is not in contact with the wall section of the linkage frame.

3. The projector according to claim 1,
wherein the optical path changer has
a first swing axis around which the swing frame is caused to swing relative to the base member, and
a second swing axis around which the optical member is caused to swing relative to the swing frame in a direction perpendicular to the first swing axis, and
the vibration absorbing surfaces of the vibration absorbing member are located between the first swing axis and the second swing axis.

4. The projector according to claim 3,
wherein a fixing section that fixes the linkage frame and the vibration absorbing member to each other is provided, and
the fixing section is located at one of the support surfaces of the linkage frame that is located between the first swing axis and the second swing axis.

5. The projector according to claim 1,
wherein the optical path changer includes
a first swing axis around which the swing frame is caused to swing relative to the base member,
a movable frame that supports the optical member and has a second swing axis around which the optical member is caused to swing relative to the swing frame in a direction perpendicular to the first swing axis,
a first actuator that causes the swing frame to swing, and
a second actuator that causes the movable frame to swing, and
the vibration absorbing surfaces of the vibration absorbing member are located between the first actuator and the second actuator.

6. The projector according to claim 5,
wherein a fixing section that fixes the linkage frame and the vibration absorbing member to each other is provided, and
the fixing section is located at one of the support surfaces of the linkage frame that is located between the first actuator and the second actuator.

7. The projector according to claim 1, wherein rigidity of the vibration absorbing member is lower than rigidity of the linkage frame.

8. The projector according to claim 1 further comprising:
a first positioner that positions the linkage frame and the vibration absorbing member with respect to each other; and
a second positioner that positions the base member of the optical path changer and the vibration absorbing member with respect to each other.

9. The projector according to claim 8 further comprising a first rotation restrictor that restricts rotation of the linkage frame and the vibration absorbing member relative to each other.

10. The projector according to claim 8 further comprising a second rotation restrictor that restricts rotation of the optical path changer and the vibration absorbing member relative to each other.

11. The projector according to claim 1, wherein the vibration absorbing surfaces of the vibration absorbing member, the surfaces that are in contact with the base member of the optical path changer, are in contact with the support surfaces of the linkage frame.

12. The projector according to claim 1, wherein a surface of the vibration absorbing member that is a surface opposite from the vibration absorbing surfaces in contact with the base member of the optical path changer is in contact with the support surfaces of the linkage frame.

* * * * *